United States Patent [19]

Newell

[11] E Re. 29,411

[45] Reissued Sept. 20, 1977

[54] HARMONIC DRIVE FOR DIGITAL STEP MOTOR

[75] Inventor: Harold R. Newell, South Newbury, N.H.

[73] Assignee: Mesur-Matic Electronics Corporation, Salem, Mass.

[21] Appl. No.: 648,693

[22] Filed: Jan. 13, 1976

Related U.S. Patent Documents

Reissue of:

[64] Patent No.: 3,644,764
Issued: Feb. 22, 1972
Appl. No.: 664,331
Filed: Aug. 30, 1967

U.S. Applications:

[63] Continuation-in-part of Ser. No. 627,410, March 31, 1967.

[51] Int. Cl.[2] ..... H02K 7/06

[52] U.S. Cl. ..... 310/49 R; 310/82; 310/83

[58] Field of Search ..... 310/49, 82, 83

[56] References Cited

U.S. PATENT DOCUMENTS

| | | | |
|---|---|---|---|
| 1,495,784 | 5/1924 | Fereday | 310/82 |
| 2,871,382 | 1/1959 | Bouvier | 310/82 |
| 2,919,587 | 1/1960 | Sundt | 310/83 X |
| 2,953,944 | 9/1960 | Sundt | 310/82 X |
| 3,088,716 | 5/1963 | Stott | 310/82 X |
| 3,117,244 | 1/1964 | Rosain | 310/82 |
| 3,200,668 | 8/1965 | Janes | 310/83 |
| 3,262,081 | 7/1966 | Fairbanks | 310/82 |
| 3,341,725 | 9/1967 | Gifford | 310/80 |
| 3,428,839 | 2/1969 | Singleton et al. | 310/82 |
| Re. 22,549 | 9/1944 | Plensler | 310/82 |

FOREIGN PATENT DOCUMENTS

| | | | |
|---|---|---|---|
| 411,282 | 6/1934 | United Kingdom | 310/82 |

*Primary Examiner*—Mark O. Budd
*Attorney, Agent, or Firm*—Pollock, Vande Sande & Priddy

[57] ABSTRACT

A digital step motor having a wobble plate which rotates about a shaft, to produce mating contact between two sets of associated gear teeth, under the influence of a stepping electromagnetic drive. The wobble plate is coupled to the shaft about which it rotates by a universal joint free to move axially but restrained radially of the shaft.

10 Claims, 8 Drawing Figures

INVENTOR
HAROLD R. NEWELL

BY Hurwitz, Rose & Greene

ATTORNEYS

FIG.4
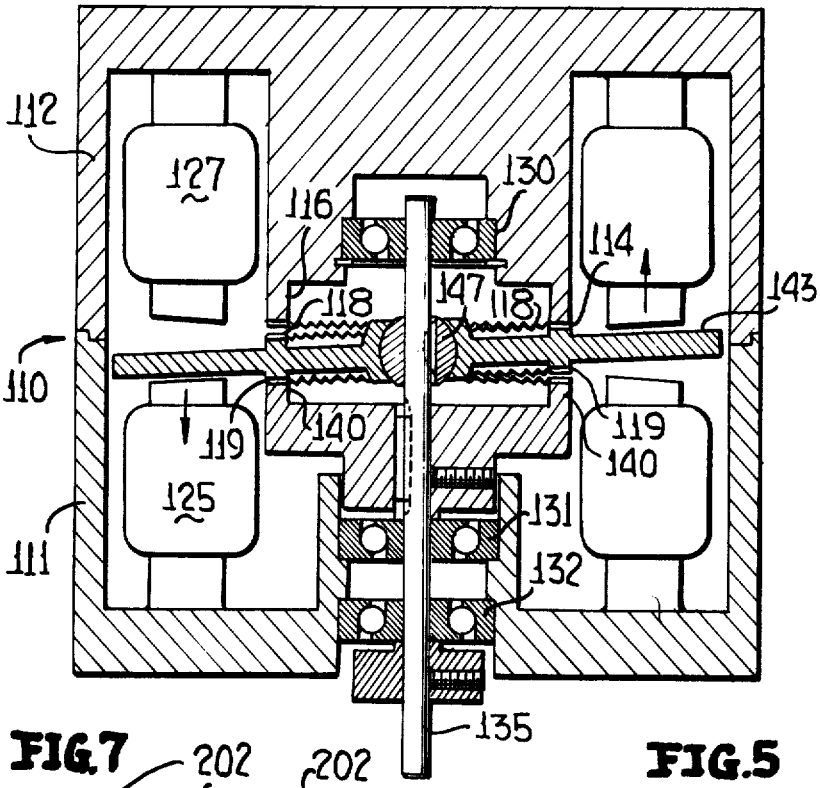
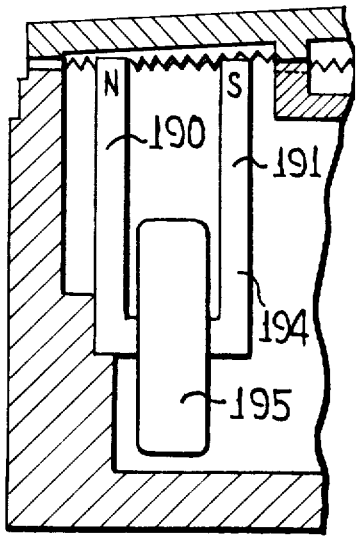
FIG.6
FIG.7
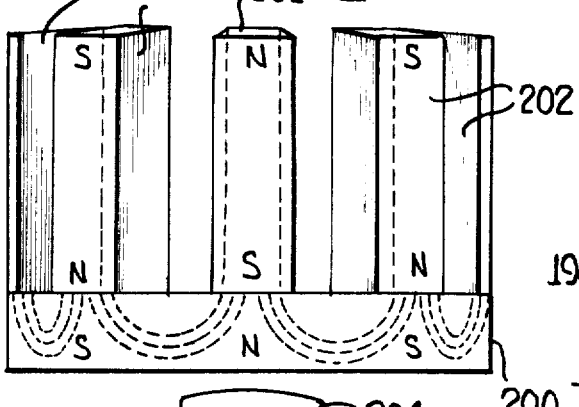
FIG.5
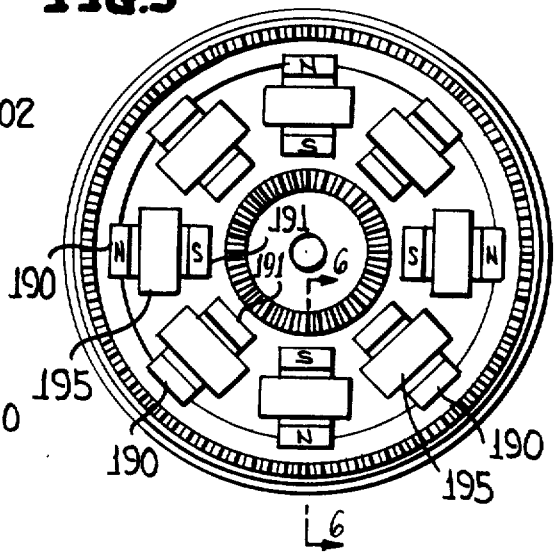
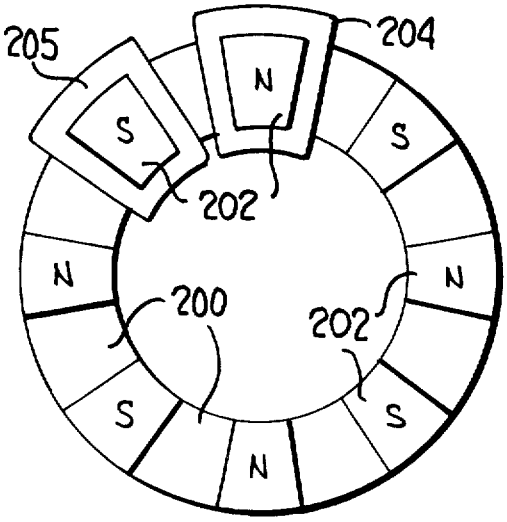
FIG.8
INVENTOR
HAROLD R. NEWELL
BY Humphrey, Rose & Greene
ATTORNEYS

HARMONIC DRIVE FOR DIGITAL STEP MOTOR

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of my copending application for United States Letters Patent, bearing Ser. No. 627,410, entitled "Harmonic Drive for Digital Step Motors," filed Mar. 31, 1967, and commonly assigned herewith.

BACKGROUND OF THE INVENTION

In my aforementioned copending application Ser. No. 627,410, hereinafter referred to as my copending application, it is observed that prior art devices for harmonic drive or strain wave gearing have received one or both of those names as a result of operation wherein areas of mating relationship or engagement between the teeth of two ring gears are peripherally propagated in the form of a sinusoidal or substantially sinusoidal wave representative of a wave deflection or strain wave in one of the gears. The concept of harmonic drive is set forth in some detail in U.S. Pat. No. 2,906,143 to Musser, issued Sept. 29, 1959. Basically, the Musser invention constitutes a motion transmitting device in which is provided a rigid circular ring gear, a flexible ring gear of different diameter from but coaxial with the rigid ring gear, and some form of strain inducing device by which the flexible ring gear is driven and at the same time deflected to force its teeth into meshing relationship with the teeth of the rigid ring gear at a plurality of circumferentially spaced points separated by areas of noncontact therebetween. In this manner, rotational driving of the flexible ring gear by the strain inducer results in the propagation of a strain wave about the periphery of the flexible ring gear, accompanied by relative rotation between the two gears.

According to the Musser patent referred to above, the circular gear or ring gear is an annular ring provided with internal teeth, i.e., teeth projecting radially along the inner periphery. The flexible gear or strain gear is also annular, being disposed within the rigid ring gear, fabricated of a thin resilient material capable of elastic deflection, and provided with external teeth projecting radially about and from the outer periphery thereof. The pitch diameters of the two gears differ as a consequence of the difference in number of teeth between the gears, the strain gear having fewer teeth than the ring gear by a number equal to or a multiple of the number of positions of mating engagement between the gears, in accordance with the predetermined distortion of the strain gear by the strain inducer when the gears are disposed one within the other. By virtue of this arrangement, at any given instant of time a large percentage of the teeth of the two cooperating gears are in contact, more than 50 percent of each.

As generally disclosed by Musser, the strain inducer is mounted on a shaft with which the strain gear and ring gear are coaxial, and has a configuration adapted to exert forces on the inner periphery of the strain gear, when inserted into a position inside the latter, so as to deflect or distort the wall of the strain gear to produce the desired configuration of mating relationship between the two gears at a plurality of circumferentially spaced positions. Thus, as the strain inducer undergoes rotation the strain gear is driven such that the teeth of the two gears enjoy complete engagement at only a limited portion of each position of mating relation and have varying degrees of engagement at either side of each limited portion, being completely separated from one another in areas approximately midway between positions of mating relation in those cases where sufficient disparity exists between pitch diameters (and tooth differential) of the gears. Accordingly, a strain wave is propagated about the periphery of the strain gear, one complete revolution of which is characterized by a tooth movement equal to the tooth differential between the gears, the gears undergoing relative rotation. Musser emphasizes that the strain inducer need not be the driving element; rather that any of the three elements (i.e., ring gear, strain gear or strain inducer) may be the driving element and either of the remaining two the driven element. The gear having the largest number of teeth per radian moves in the same direction as the strain inducer when the latter is the driving element.

Among the variations of strain inducer or wave generator mentioned by Musser in his aforementioned patent are a pair of electromagnetic embodiments, one involving polyphase energization and the other single-phase energization. More recent patents of related disclosure indicate a recognition that electromagnetically energized strain wave gearing or harmonic drives were not actually previously constructed, and proceed to disclose suitable forms thereof. One of these patents, U.S. Pat. No. 3,169,201, entitled "Electromagnetic Harmonic Device" issued Feb. 9, 1965, in the names of Spring et al., contemplates elimination of the mechanical strain inducer or wave generator cam and its bearing, and of the shaft coupled thereto, as provided in the invention disclosed in the aforementioned Musser patent, and utilization in its stead of an electromagnetic drive system including a stator and a rotor. The rotor of the Spring et al. invention comprises a plurality of thin flat magnetically permeable plates of substantial nonretentivity projecting radially from and lying in planes intersecting the common axis of the output shaft and the gears, toward respective lineal positions adjacent the surface of the strain gear (also termed "flexspline") remote from the ring gear (also termed "circular spline"), and arranged to pivot against the surface when subjected to magnetizing force. The stator comprises an even number of evenly spaced pairs of solenoid coils (with magnetic cores) disposed in a circular array coaxial with the array of rotor plates and spaced from portions of the plates protruding from the flexspline. Progressive radial distortion or deflection of the flexspline to produce a mating relation between the two splines (gears) at a plurality of points is effected by energization of an appropriate plurality of the coils in a desired sequence, thereby sequentially forcing the magnetic plates (i.e., deforming the armature) against the internal surface of the flexspline, resulting in strain wave meshing of the splines as in the aforementioned Musser patent. The Spring et al. patent discloses this electromagnetic wave generator as an actuator for a digital stepping motor, wherein diametrically opposed pairs of solenoid coils are energized in sequence by a control circuit, also disclosed, to produce radial deflection of the flexspline into an elliptoidal shape, with progressive circumferential strain wave deflection in discrete steps.

In U.S. Pat. No. 3,169,202, issued Feb. 9, 1965 in the names of Proctor et al. still other types of electromagnetic actuators for strain wave gearing or harmonic drives are disclosed, these actuators having a continuously rotating field and differing one from another primarily in respect to type of armature. The basic configuration by which the strain wave deflection is propagated is, however, entirely similar to that disclosed in the aforementioned Musser and Spring et al. patents. The armatures described in the Proctor et al. patent include an endless chain of magnetically permeable rigid links, adjacent links pivotal relative to one another, the chain disposed adjacent the surface of the flexspline remote from the ring gear; a laminated core, the laminations being in successive plates along the axis of the actuator and coaxial therewith, the periphery of the successive laminations being interrupted by equiangularly spaced slots in which magnetic powder is disposed, adjacent the internal surface of the flexspline; and a coiled magnetically permeable flat strip positioned adjacent the internal surface of the flexspline. In the case of each of these types of armature the continuously rotating field produced by appropriate energization of an associated stator is effective to distort the respective armature, thereupon subjecting the flexspline to deflecting forces.

In my copending application, I disclose an improvement upon the aforementioned prior art forms of harmonic drive system, wherein the basic concept of the wobble plate type of electromagnetic motor is employed together with sequential switching of the stator windings to produce the desired stepped rotation of a wobble plate or wobble disk rotor. Accordingly to an embodiment of that invention, a pair of cooperating circular ring gears of the same diameter are provided with teeth projecting from confronting planes. At least one of the ring gears is rigid, fastened to the internal surface of the larger diameter wall of a concentric double cylindrical walled housing having a bridge joining the walls at a common end thereof to form a "doughnut cup" shaped enclosure. This enclosure or housing contains a laminated annular magnetic core having a plurality of equiangularly spaced coils, corresponding to the desired number of motor phases, wound thereon. A shaft extends within the inner wall of the housing along the axis thereof and is mounted for rotation in bearings retained at either end of the space encompassed by the inner wall. An armature or rotor in the form of a magnetically permeable circular plate is retained on the shaft for relative rotation therewith and has adjacent its periphery along a planar surface of the plate the second of the aforementioned ring gears, one ring gear (preferably that on the armature) having at least one less tooth than the other ring gear, the teeth of the two gears normally spaced from one another. In the preferred embodiment the armature is rigid, as is its ring gear. One end of the magnetic core in the housing confronts the armature and as the phases (field windings) of the motor are energized in the desired switching format, the armature is successively pulled toward each energized coil. Accordingly, the teeth of the two ring gears are forced into mating engagement, i.e., intermesh, at only one limited region of each gear at any given instant of time. As the coil switching progresses the armature wobbles about the shaft, the position at which its ring gear meshes with the stationary ring gear fastened to the housing propagating sinusoidally along that gear in accordance with the wobble motion. This constitutes a substantially sinusoidal wave motion, the armature constituting a mass rotating at an extremely low rotatory rate which depends upon tooth differential, number of motor phases, and switching format for the phases. A relative rotation occurs between the two ring gears, and if the armature has the fewer teeth it rotates that number of fewer teeth for each revolution of the wobble (i.e., each revolution of the intermeshed position of the gears), and in a reverse direction to the direction of rotation of the wobble. A second pair of ring gears is provided by which the armature is coupled to the shaft to drive the latter in accordance with armature rotation so that the shaft undergoes discrete (stepped) rotational motion in accordance with the switching format phase energization of the motor. This second pair of gears operates to transmit torque to the shaft in a positive and reliable manner, yet with a minimum of frictional drag or loss of power due to wear. In the harmonic drive system of my copending application, it will be noted that the teeth of the cooperating ring gears are engaged at only one portion of the overall ring, so that complete or partial meshing occurs between only a small number of teeth at any given instant of time. Consequently, the load or force on the shaft is not truly balanced, a condition which is somewhat disadvantageous when compared with harmonic drive systems of the prior art.

However, the invention disclosed in my aforementioned application enjoys several advantages over prior art harmonic drives, resulting in a decided overall improvement. For example, no power need be applied to the "strain inducer" unless actual stepped rotation is desired. In contrast, the prior art systems require application of power to the strain inducer in order to deform the flexspline even when the system is in a condition undergoing no rotational movement but in a state of preparedness to do so. Over a lengthly period of continuous use this can result in a substantial power saving in favor of the apparatus of my previous invention.

Moreover, the prior art flexsplines have been found to be resonant at a number of different frequencies, a condition which results in loss of smooth and efficient performance. This cannot readily occur in the drive system of my earlier invention, because unlike the prior art strain gears, there is no thin elastic tubular flexspline structure.

Wobble plate motors per se are, of course, known insofar as basic concepts are concerned. The invention disclosed in my copending application, however, combines the broad wobble plate or wobble gear concept with two pairs of mating gears, one gear of each pair disposed on a wobble plate of magnetically permeable material, and the other gear of one pair fixed by attachment to the housing, while the other gear of the other pair is coupled in driving relation to the shaft; along with a driving or energizing circuit by which the motor windings are sequentially switched to produce the stepped rotation with rotor "wobble around."

In only one prior art electromechanical wobble gear actuator of which I am aware is there an arrangement utilizing at least two pairs of gear teeth, one row of teeth of each pair on the wobble plate and the other row of teeth of each pair affixed to a frame member and to a shaft, respectively. In that prior art actuator, however, the wobble gear, i.e., the rotor, has a web portion formed of a high coercive force permanent magnet material radially magnetized with a center of one polarity and a periphery of opposite polarity. Stator poles are disposed about the periphery of the frame with windings thereon, which when energized, drive the polarized armature. A major problem resides in the maintenance of perfect mating contact between the rigid gear surfaces. This ordinarily requires the use of precise construction measures by which all gear teeth are cut to provide complete meshing between each pair of associated gears. It will be appreciated that such a requirement is accompanied by high cost of production and is essentially ruled out from a practical standpoint. A further requirement is the establishment of sufficient force on gears to insure complete and continuous meshing of the teeth as the wobble plate rotates. Although the desired mating contact may be assured in a new set of gears by the aforementioned exacting and expensive methods of cutting the teeth, nevertheless gear teeth wear rather rapidly when subjected to continuous or lengthly periods of operation. A related problem, then, is the maintenance of desired mating contact between teeth of associated gears despite wear, and more particularly, uneveness of teeth in the initial gear sets. With conventional wobble plate coupling arrangements, imperfections in associated gear teeth and wear of the teeth as operation continues are accompanied by play, i.e., excess and usually nonuniform freedom, between the gears themselves, which is transmitted also to members to which the gears are fastened, such as input or output shaft. This situation creates nonuniformly of rotation of the gears, with intervals of speedup and slowdown during each period of rotation, compounding the uneveness of wear.

The use of special biasing arrangements has been suggested, for example of the employment of springs arranged to force the gears and gear teeth together. However, if the spring force is excessive a substantial amount of energy must be expended to overcome that force and to cause the gears to mate, thereby reducing efficiency; and if insufficient spring force is available the gears will intermittently separate under conditions of loading.

SUMMARY OF THE INVENTION

According to the present invention, a wobble plate step motor is provided in which the advantageous motor construction disclosed in my copending application is generally retained, with the further provision of improvements in the manner of coupling of the two sets of gears. The wobble plate or disk is driven by a stepped magnetic field to rotate on tracks formed by the two sets of gears. The coupling point, in the form of a universal joint between wobble plate and shaft on which the plates rotates, is free to move longitudinally along the axis of rotation, but a sufficient tight fit is maintained to prevent radial movement of the coupling point during rotation. The force exerted by the driving magnetic field is thereby divided between the two sets of gears such that both sets are held in full mesh at all times with virtually none of the looseness or play found in prior art wobble motors.

Accordingly, it is a principal object of the present invention to provide improvements in harmonic drive for digital step motors.

It is a more specific object of my invention to provide wobble plate or wobble disk step motors having improved coupling arrangements whereby to assure perfect mating contact between gears throughout motor operation, despite lack of precise cutting and matching of gear teeth and wear or uneveness of wear of the teeth.

Another object of the present invention is to provide a wobble plate step motor in which the wobble path is coupled to a shaft, forming an axis of rotation therefor, by a universal joint free to move axially but restrained against radial motion on the shaft.

Still another object of the present invention resides in the provision of a magnetic detent, in step motors of the abovementioned type, whereby to maintain the wobble plate held in a tipped position without the need for applied power.

BRIEF DESCRIPTION OF THE DRAWINGS

The above and still further objects, features and attendant advantages of the present invention will become apparent from a consideration of the following detailed description of certain preferred embodiments thereof, especially when taken in conjunction with the accompanying drawings, in which:

FIG. 4 is a sectional view showing a dual stator arrangement in a step motor of the general type shown in FIG. 1;

FIG. 5 is an end view of a radial stator arrangement;

FIG. 6 is a fragmentary sectional view taken along the lines 6—6 of FIG. 5, and FIGS. 7 and 8 are, respectively, side and end views of a premagnetized stator structure for provision of magnetic detent in the digital step motor.

DESCRIPTION OF THE PREFERRED EMBODIMENT

Figure 1:
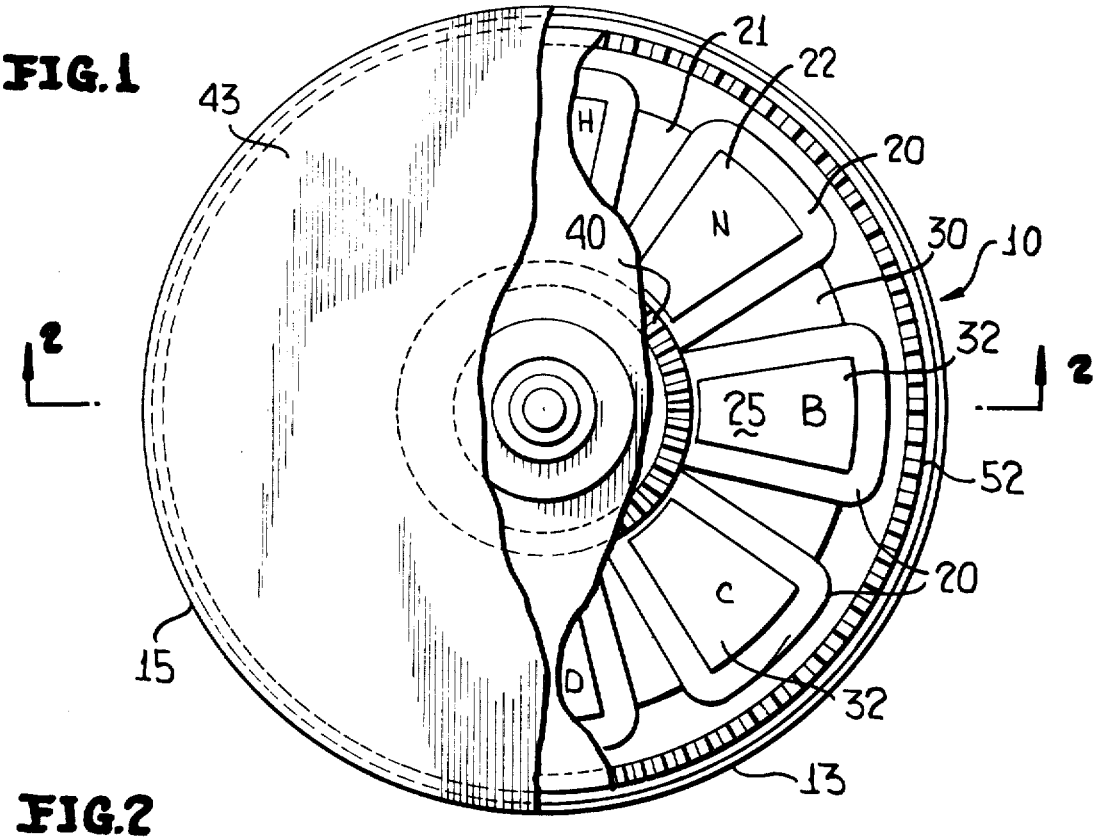
FIG. 1 is a top or end view, looking toward the armature end, of s step motor in accordance with an embodiment of the present invention.

Referring now to the drawings, an embodiment of my wobble plate step motor includes a doughnut-shaped housing 10 comprising a pair of coaxial cylindrical walls 12, 13 bridged at a common end 15 by a wall 17. Housing 10 is composed of any suitable nonmagnetic material and is adapted to partially enclose and retain the field windings 20 and magnetic core 21 of the stator portion 25 of the digital step motor.

Core 21 preferably comprises a strip of magnetically permeable sheet material wound in successive layers in an annular or toroidal configuration. The core is preferably provided with angularly spaced slots 30 to accommodate field windings 20 wound on the successive laminations of magnetic sheet material of which the core is comprised. The field winding end terminations or leads are brought out through the housing at any convenient point or points (not shown) to permit connection to an energizing circuit (not shown). The winding or phase energizing circuit is preferably of the step driver type, such as that disclosed in my copending application Ser. No. 581,334, although other types may be used, as desired.

Pole faces 32 of magnetic core 21 are milled off at a slight angle, 1° for example, (as shown at 33) to the plane perpendicular to the axis of the core, for reasons which will be discussed presently.

A shaft 35 is disposed along the axis of the symmetrical motor structure thus far described, mounted for rotation in bearings 37 and 38 at the bridged and free ends, respectively, of cylindrical wall 12 of housing 10. The shaft is provided with a larger diameter section 39, or with suitable collars, to insure its longitudinal retention within the bearings, the latter being preferably designed to accept axial as well as radial loads. Pinned or otherwise suitably fastened to shaft 35 at a point adjacent bearing 38 is a circular ring gear 40, hereinafter referred to also as "inner" or "internal" ring gear 40 to prevent confusion with other ring gears of greater diameter. It will be apparent then that ring gear 40 follows the rotation of the shaft, or vice versa.

Further along the shaft there is disposed a rotor or armature 43 which in the preferred embodiment is a magnetically permeable rigid circular plate. A bearing cup 45 is fastened within a centrally located hole in 43 to hold the rotor to a bearing 46 which includes a ball member 47, having an axial hole therein of sufficient diameter to accept the shaft in relatively tight fit but slidable relationship, and on which the rotor is permitted to pivot. Hence, rotor or armature 43 can undergo rotation relative to the shaft and is capable of assuming a cocked position at a slight angle to the shaft. A retaining ring 48 is press-fitted on shaft 35 to prevent the rotor from lifting too far. The central or axial hole in ball member 47 permits the entire ball or universal joint to move axially along the shaft to take up any play or looseness which might otherwise be manifested in the meshing of the gears, as the result of wear or unevenness of teeth, for example, and yet prevents any significant radial motion of the ball joint. Accordingly, the wobble plate 43 is similarly capable of free axial movement but is restrained radially.

Armature (i.e., rotor or wobble plate) 43 is provided with a pair of ring gears 49, 50 fastened to or cut on that one of its surfaces confronting the pole faces 32 of magnetic core 21, ring gear 49 being identical or substantially identical to ring gear 40 in respect to diameter and number or character of teeth, and adapted to mate therewith. The outer or external ring gear 50 is disposed at the underside of armature 43 adjacent its outer periphery, and opposite a stationary ring gear 52 of substantially equal diameter fastened to the inner surface of the free end of cylindrical wall 13 of housing 10.

The relative positions of the several ring gears of the motor configuration are such that confronting teeth on cooperating outer gears 50 and 52 and cooperating inner gears 49 and 40 can mesh only in a limited area of each respective pair of gears along a common sector from the axis of the overall structure at any given instant. The diameters of the outer cooperating gears 50 and 52 are substantially equal, but the number of teeth, and hence tooth size, differ. In the exemplary embodiment shown, armature ring gear 50 has 359 teeth and stationary ring gear 52 has 360 teeth. Each of the inner gears 40 and 49 is provided with 60 teeth, for example, all teeth cut on, say, a 30° angle with respect to a radial plane.

Housing 10 is closed by a cuplike cover 60 (FIG. 2) which, like the housing, is composed of nonmagnetic material. Preferably, the stator, including winding 20 and core 21, is potted within housing 10 up to or slightly beyond the level of the field windings, using an epoxy resin for example. While eight field windings (phases) are shown, a smaller or greater number of phases may be utilized, as desired.

In operation, the field windings are selectively energized by the switching or energizing circuit (not shown) in accordance with the preselected switching format, for example. A+B, B+C, C+D, D+E, E+F, F+G, G+H, H+A, et cetera, the armature being pulled toward the energized windings in the recited sequence. Thus, the two outer gears 50 and 52 mesh along a sector region, and this meshed region propagates with the "phase switchings" which produce the wobble of armature disk 43 about shaft 35. The slight angle at which the pole faces are milled with respect to a plane perpendicular to the shaft permits this rotor wobble to occur without interference between members. Because of the differing number of teeth on the rotor and stator outer gears 50 and 52, respectively, a relative rotation between these elements takes place as the sector of meshing rotates one full revolution, i.e., for each 360° of wobble-around of the rotor. In particular, for the above-stated number of teeth, the armature (rotor) rotates 1°, which coincides with one tooth, for each 360° of wobble, and in a reverse direction to the direction of wobble. If the number of teeth on the rotor ring gear 50 were greater than that on the stator ring gear 52, the relative rotation would be in the same direction as the wobble.

As wobble plate 43 rotates, the teeth of the inner gears 40 and 49 also mesh in a corresponding sector to that of gears 50 and 52, thereby driving shaft 35. For the stated number of teeth, the shaft undergoes 1° of rotation per full revolution of wobble. With either field windings (phases), each revolution of wobble requires eight-phase switchings. Accordingly, each 360° rotation of the shaft requires $8\times360=2{,}880$ steps or phase switchings. Meshing of the two sets of gears in the aforementioned manner is maintained irrespective of slight imperfections in or uneveness of the teeth of the two sets of gears, and despite gear wear occurring with continued use of the motor, as a consequence of the axial freedom of the ball joint and wobble plate. The magnetic field generated by the stator in accordance with the switching format produces a force which is thereby divided between the two sets of gears and assures substantially equal meshing pressure on the gears at the sector corresponding to the actuated stator coils. The absence of radial motion of the ball joint, and hence of the wobble plate, further assures accurate rotation of the output shaft 35 without looseness or play between gears.

The force exerted on the gears in the aforementioned limited sector (which, of course, rotates with the phase switchings) by the magnetic field accompanying the energization of field windings produces cocking or tipping of disk 43 despite the axial freedom of the ball joint. In this respect, it will be noted that the described operation creates an unbalance of forces, with a strong downward pressure exerted on the left-hand side of plate 43, as viewed in FIG. 2, and practically zero force on the diametrically opposite region of the plate, for a particular instant of operation. The wobble plate pivots about the ball or universal joint, moving it slightly upward on the shaft 35, so that the plate is cocked. The consequent position of the ball joint longitudinally along the shaft is self-aligning or self-orienting according to the wear on the gears and the uneveness of the teeth, as previously discussed.

A wide number of variations of construction may be effected within the contemplation of the present invention. For example, the rotor 43 may be composed of flexible material incorporating rigid or powdered magnetic material to permit flexing into contact with the stator outer gear as the field windings are switched.

Moreover, the cooperating surfaces of the gears need not be provided with teeth, but may be splined, ridged, knurled or otherwise supplied with surfaces capable of frictional engagement or contact. In fact, such frictional resilient material as natural or synthetic rubber may be utilized for the cooperating surfaces of the gears, or one surface may be rubber and the other rigid with frictional contact portions such as ridges for enhancement of mating. In such cases, the angle of the rotor requires that the circumference of the contacting surface of the rotor be somewhat greater than the circumference of the contacted surface of the stator "gear." The smaller the angle of rotor tilt, the greater the ratio of "wobble-arounds" versus shaft rotation, as may readily be determined from trigonometry.

The magnetic field effecting the rotor wobble may be produced by energizing separate phases in a DC switching format, or by two- or three-phase AC energization.

Any of these modifications produces, as in the preferred embodiment, extremely low rotational speeds with high positioning accuracy and with simple construction and inexpensive components.

Figure 3:
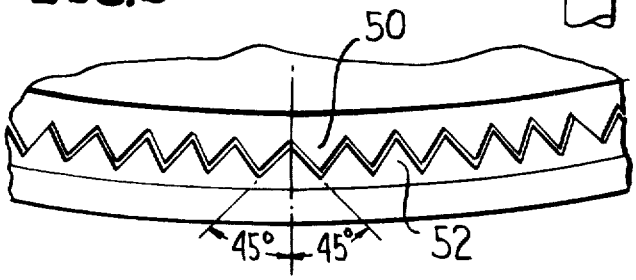
FIG. 3 is a fragmentary perspective view of engaged teeth of a set of cooperating gears in the motor of FIGS. 1 and 2.

In the preferred embodiment which has been described, references to the single limited region or area of contact or engagement should not be taken as necessarily implying a single point or position of contact. In many instances, the single region of contact may, in fact, extend over a substantial length, but unlike the prior art there are no multiple areas of engagement separated by areas in which the two gears are displaced substantially from one another. In the case where the cooperating surfaces of the gears are rigid triangular teeth, for example, it happens that actual contact between the two toothed surfaces occurs at two spaced points at which the sides of the mating teeth rest against one another and between which the teeth are lifted slightly from each other (see FIG. 3). For practical purposes, however, the entire area or region between these contact points constitutes the area of frictional contact or mating engagement, since true meshing, cooperation, or engagement exists throughout such area.

The advantages of this cooperating frictional surface approach as contrasted with prior art flexible spline arrangements include, for example, a very low holding power requirement, since there is no "springiness" to overcome; improved transient (start-stop) response because of the lack of such "springiness" in the drive; greater efficiency; economy in fabrication and production; and nonslip operation.

Referring now to FIG. 4, there is shown a sectional view, similar to FIG. 2, of a dual stator arrangement of a step motor otherwise corresponding closely to that described above in connection with FIGS. 1-3. In view of these similarities, the motor configuration of FIG. 4 will be described only insofar as it differs significantly from the previously described step motor.

The housing 110 is comprised of two matching portions, 111 and 112, which may be secured together in any convenient and conventional manner, as by a strap or band and suitable fasteners (not shown). Housing portion 111 corresponds in almost every respect to housing 10 of FIGS. 1-3, except that it has no outer stationary ring gear as at 52 of the earlier Figures. Nor does wobble plate (rotor or armature) 143 have an outer gear. Instead, stationary gear 114 is cut along or fastened to an annular region or frame 116 of housing portion 112.

Mating ring gears 118 and 119 for stationary gear 114 and shaft-pinned gear 140, respectively, are cut or otherwise provided, as by fastening, on opposite sides of wobble plate 143. In this embodiment, the same number of teeth are provided on both stationary ring gear 114 and wobble disc ring gear 118, while a tooth differential exists, as determined by considerations previously noted, for ring gears 119 and 140.

Wobble disc 143 is coupled to the shaft 135 by the same type of axially free, radially confined universal or ball joint 147 as described earlier. Because of the dual stator configuration, in which a second corresponding stator portion 127 is disposed opposite the stator portion 125, the shaft 135 is longer than in the earlier-described embodiments, and is maintained for rotation in bearing 130 as well as bearings 131 and 132.

In operation of the dual stator embodiment, a coil or adjacent coils of one of the stators (125 or 127) are energized simultaneously with the energization of a coil or adjacent coils diametrically opposite thereto on the other of the stators (127 or 125, respectively). For an eight-phase stator, for example, the sequence for the lower stator, as viewed in FIG. 4, might be the switching sequence 1 and 2 (this numbering referring to the coil-core combinations, or phases), 2 and 3, 3 and 4, 4 and 5, ..., 7 and 8, 8 and 1, and so forth. During the respective time intervals over which the preceding phase switchings occur, the upper stator would be energized according to the sequence 5 and 6, 6 and 7, 7 and 8, 8 and 1, ..., 3 and 4, 4 and 5, and so forth. This assumes that the numbering of phases is identical for the two stators, i.e., upper stator phase No. 1 is directly opposite lower stator phase No. 1, and so forth. For reversal of wobble, the phase switching sequence is reversed. Accordingly, an upward force, for example, is exerted on the right-hand side of wobble disc 143, as viewed in FIG. 4, while a downward force is exerted on the left-hand side of the wobble disc, during a given time interval, the plate wobbling about the "tracks" provided by the gears. It will be observed, then, that the dual stator configuration doubles the effective torque capability of the motor for the same size disc, and thereby increases the speed of step response of the motor. Moreover, since the ball joint 147 provides axial freedom and radial confinement of the disc, both sets of gears bottom, i.e., are forced into meshing engagement, despite any unevenness or nonuniformity which may result from gear wear or production tolerances.

Preferably, the wobble disc gear 118 and stationary or frame gear 114 have triangular teeth cut on a 30° angle, and the disc gear 119 and shaft gear 140 have triangular teeth cut on a 45° angle. Because gears 114 and 118 have the same number of teeth, disc or plate 143 does not rotate, but only wobbles about the axis of the shaft on the tracks presented by the gears. This reduces inherent motor inertia while concurrently enhancing the external inertia handling capability of the motor. Ring gear 140, and hence shaft 135 to which it is pinned or keyed, rotates slowly either clockwise or counter-clockwise about the axis, depending upon the difference in number of teeth between that gear and wobble disc gear 119, as disc 143 wobbles.

By introducing a tooth differential between disc gear 118 and frame gear 116, as well as retaining the tooth differential between disc gear 119 and shaft gear 140, the ratio of wobble around to shaft rotation may be considerably increased or decreased, as desired. If, for example, the shaft gear 140 has 91 teeth, and mating disc gear 119 has 92 teeth, shaft 135 will rotate at a rate of one complete revolution per 91 "wobble arounds" of the disc. If, in addition, disc gear 118 has 90 teeth and frame gear 116 has 89 teeth, the disc will rotate one complete revolution in the forward direction (i.e., in the direction of the phase switchings) for each 90 wobble arounds. Under these conditions, shaft 135 will rotate in a direction opposite that of the disc, and will make one complete revolution (relative to the housing) for each $(90)^2$ wobble arounds. For two 90:1 ratios in the same direction, an overall 45:1 ratio would result.

Figure 2:
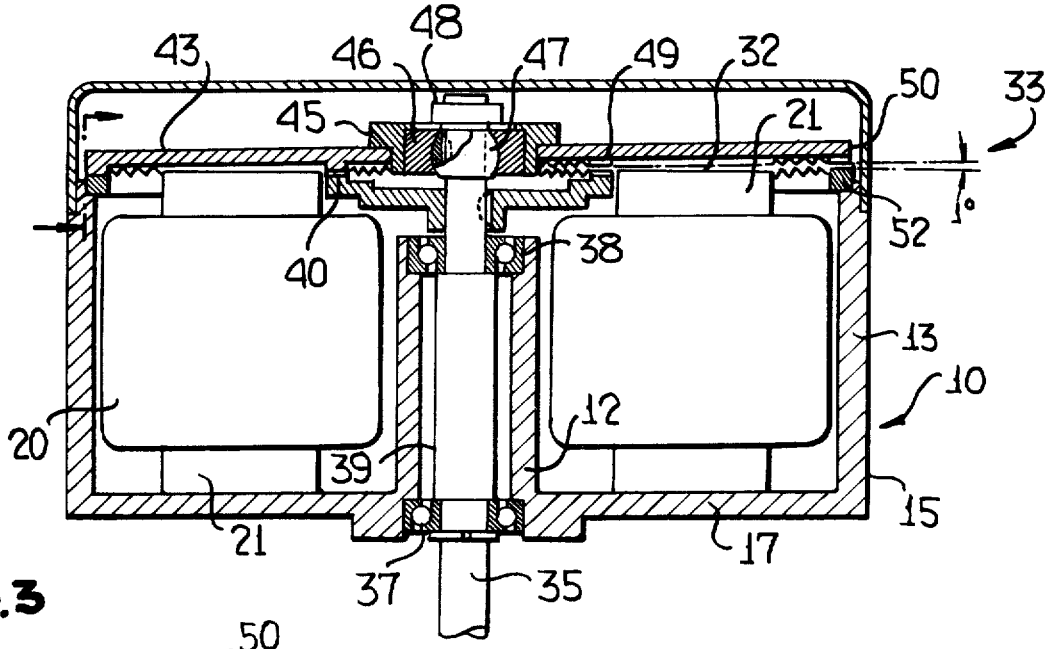
FIG. 2 is a sectional view taken along the lines 2—2 of FIG. 1.

Referring again to the embodiment of FIGS. 1 and 2, it will be noted that the force on the wobble plate, as exerted by the magnetic field, acts between the two pairs of gears; and since their horizontal point is a ball joint which is free to move axially (i.e., longitudinally) along the shaft but is restrained in the radial direction, the force is divided between the two gears in such a manner that both pairs are held in mesh in the aforementioned limited sector without any tendency toward looseness. This cannot occur if the pivot point of the gears is constrained to a fixed point along the axis, e.g., if it were fastened to the shaft, unless the gears are precision cut for perfect engagement and not subject to wear over long periods of use. It is to be observed that the problem of maintaining a tight mesh between the gears is aggravated by the existence of more than one pair or set of gears, and is practically insoluble in the absence of a "floating" pivot point in accordance with the present invention.

Similar considerations exist for the dual stator embodiment of FIG. 4.

The use of springs or other resilient biasing means to compensate for irregularities in one or more pairs of gears is not completely effective and leads to further problems. Where the spring force is too large to be easily overcome under normal motor driving force, as would be the case if tight intermeshing of at least one pair of gears is to be contemplated, a decrease in motor efficiency is observed as a result of the energy required to overcome spring tension. Moreover, the presence of resilient biasing arrangements for the gears tends to set up spontaneous vibrations and mechanical resonance, or "ringing," problems during the stepping motor operation.

A modification of the stator poles in the embodiment of FIGS. 1 and 2 is shown in FIGS. 5 and 6. Instead of a circumferential placement of the poles on a common or substantially common core, the magnetic poles are radially positioned with each set of north and south poles 190 and 191, respectively, associated with a different core and coil, such as 194 and 195, respectively. By virtue of this magnetic separation of neighboring poles, it is possible to provide a faster buildup of magnetic lines of force or flux with each phase switching.

Still another modification of the stator poles is shown in FIGS. 7 and 8. Here, a magnetic ring 200 is employed as the base of the stator core, the ring being permanently magnetized in zones, as shown, to provide alternate north and south poles matched with the positions at which magnetically permeable pole pieces 202 are mounted to the magnetic ring. The field coils (e.g., 204, 205) are wound about the upstanding pole pieces in a manner corresponding to that shown in FIGS. 1 and 2.

This embodiment provides a magnetic detent to maintain the permeable rotor (wobble plate) tipped against the poles to which it is most closely adjacent when energization of the phases is ceased, since the attractive force exerted on the rotor varies inversely as the square of the pole to rotor spacing. Accordingly, the rotor may be held, or latched, without the need for applying power to the motor, a desirable feature in such applications as incremental tape drive where operation is intermittently halted pending the recording of information.

While I have disclosed certain preferred embodiments of my invention, it will be apparent to those skilled in the art to which the invention pertains that variations in the specific details of construction which have been illustrated and described may be resorted to without departing from the spirit and scope of the invention as defined by the appended claims.

I claim:

1. A motion transmitting system, comprising a pair of cooperating gears having confronting frictional surfaces projecting from normally spaced generally parallel planes, electronmagnetic means for selectively deflecting sequential points of one of said gears toward and away from the other to produce sequential engagement of said frictional surfaces at instantaneously limited regions of said gears, said gears having mutually different configurations adapted to provide continued digital rotations of said one gear responsive to said deflections, a shaft, and universal joint means coupling one of said gears to said shaft, said universal joint means being arranged for wholly free axial and pivotal movement *over at least a predetermined range of movement* without radial movement relative to said axis, wherein each of said frictional surfaces comprise teeth, and wherein said frictional contact is achieved by engagement of said teeth, said different configurations being produced by different numbers of teeth on said gears, wherein said cooperating gears are annular, lying along a common axis, the teeth thereof projecting from normally uncurved confronting surfaces thereof, said electromagnetic means including a magnetically permeable armature coupled to said one gear, and electromagnetic actuators disposed in circular array about said common axis, each of said actuators effective when energized to produce an electromagnetic field exerting deflecting forces on said armature and therefore on said one gear coupled thereto, wherein said armature comprises a rigid circular plate, said ring gear fastened to a planar surface thereof adjacent the periphery of said plate, a shaft extending along said axis and through said plate, normally perpendicular thereto, said plate retained on said shaft to permit relative rotation and limited angular orientation therebetween from the normally perpendicular relationship.

2. The invention according to claim 1 wherein said armature is responsive to sequential energization of said actuators in predetermined switching format to wobble about said shaft, thereby producing substantially single-point engagement between said gears, and wherein is provided a second pair of gears coupled respectively to said armature and said shaft to produce rotation of said shaft at slow speed relative to the speed of rotation of armature wobble about said shaft.

3. A motion transmitting system, comprising a pair of cooperating gears having confronting frictional surfaces projecting from normally spaced generally parallel planes, electromagnetic means for selectively deflecting sequential points of one of said gears toward and away from the other to produce sequential engagement of said frictional surfaces at instantaneously limited regions of said gears, said gears having mutually different configurations adapted to provide continued digital rotation of said one gear responsive to said deflections, a shaft, and universal joint means coupling one of said gears to said shaft said universal joint means being arranged for wholly free axial and pivotal movement *over at least a predetermined range of movement* without radial movement relative to said axis, wherein each of said frictional surfaces comprise teeth, and wherein said frictional contact is achieved by engagement of said teeth, said different configurations being produced by different numbers of teeth on said gears, wherein said cooperating gears are annular, lying along a common axis, the teeth thereof projecting from normally uncurved confronting surfaces thereof; said electromagnetic means including a magnetically permeable armature coupled to said one gear, and electromagnetic actuators disposed in circular array about said common axis, each of said actuators effective when energized to produce an electromagnetic field exerting deflecting forces on said armature and therefore on said one gear coupled thereto, further including a shaft disposed along the axis of said armature, said shaft and said armature arranged for relative rotation, and a further pair of gears, one coupled to said armature and the other coupled to the shaft in cooperating relationship with said one of said further pair of gears, to produce rotation of said shaft in response to deflection and consequent rotation of said armature.

4. A step motor comprising a shaft, at least one pair of cooperating substantially planar gears having confronting spaced frictional surfaces and having a common axis with said shaft, *said gears of said at least one pair having an unequal number of teeth,* a wobble plate supporting one *gear* of said *at least one* pair of gears, *the other gear of said at least one pair of gears being non-rotatively fixed to said shaft,* means pivotally coupling said wobble plate to said shaft for free axial movement therealong *over at least a predetermined range of movement* and rotation thereabout while substantially confining said wobble plate against radial motion with respect to said shaft, and means for selectively forcing said wobble plate to pivot on said coupling means to sequentially force portions of said gears in frictional contact against one another for producing relative rotation of said gears *and thereby rotation of said shaft.*

[5. The invention according to claim 4 wherein is further provided means coupling at least one of said pair of gears to said shaft to produce rotation of said shaft.]

[6. The invention according to claim 5 wherein said means coupling at least one of said pairs of gears to said shaft includes a further pair of gears, said wobble plate supporting one of said further pair of gears, and means securing the other of said further pair of gears to said shaft.]

7. The invention according to claim 4 wherein said wobble plate comprises magnetically permeable material, and wherein said selective forcing means includes electromagnetic means selectively energizable to produce sequential deflection of said wobble plate about said pivotal coupling means.

8. The invention according to claim 7 wherein said electromagnetic means comprises a pair of stators each including a plurality of core-coil combinations corresponding to switching phases for said motor, said wobble plate disposed between said stators.

9. The invention according to claim 8 wherein is provided a further pair of cooperating gears coaxial with the first-mentioned pair of gears, said wobble plate supporting one of said further pair of gears on a surface opposite that on which said one of said first-mentioned pair of gears is supported, said pair of stators arranged for selective energization to deflect said wobble plate for frictional contact between diametrically opposed portions of respective gears of said first-mentioned and further pairs of gears.

10. The invention according to claim 7 wherein said electromagnetic means includes a plurality of coils, each coil having a magnetically permeable core.

11. The invention according to claim 7 wherein said electromagnetic means comprises a stator having a plurality of core-coil combinations corresponding to switching phases for said motor, said stator having a permanently magnetized portion to provide a magnetic detent for maintaining said wobble plate in the last-deflected position thereof upon cessation of said selective energization.

12. The invention according to claim 11 wherein said magnetized portion comprises a member fastened to all of the stator cores and permanently magnetized in successive opposite polarity zones at the respective points of fastening of said cores.

* * * * *